March 30, 1948.    T. J. BELL    2,438,598
CELERY CUTTER
Filed May 18, 1945    3 Sheets-Sheet 1

Thomas J. Bell
Inventor

By Paul S. Eaton
Attorney

March 30, 1948. T. J. BELL 2,438,598
CELERY CUTTER
Filed May 18, 1945 3 Sheets-Sheet 3

Thomas J. Bell
Inventor

By Raul S Eaton

Attorney

Patented Mar. 30, 1948

2,438,598

UNITED STATES PATENT OFFICE 2,438,598

CELERY CUTTER

Thomas J. Bell, Island Grove, Fla.

Application May 18, 1945, Serial No. 594,494

19 Claims. (Cl. 55—60)

1

This invention relates to a vegetable cutter and more especially to a device for cutting simultaneously two rows of celery.

Celery is laid out in definite rows; that is, the rows are usually formed by stretching a wire across the field and the rows are laid out in practically a perfectly straight line, a given number of inches apart. These rows are spaced differently to accommodate spraying machines and the like. For example, one type of spraying machine covers twelve rows of celery, and sprays twelve rows of celery at a time. Therefore, it is necessary in order to prevent bruising of the celery plants, to have the rows in which the tractor wheels run slightly farther apart than the rows along which no object passes in a spraying operation. Furthermore, the spray boom usually has a trusswork extending downwardly in spaced relation on each side of the tractor for lending rigidity to the boom. These middles between the rows where this trusswork of the spray boom passes, also are slightly wider than some of the other middles, so as to prevent this trusswork from bruising the celery plants as the spraying apparatus is passed over the field. In one locality, the rows are spaced with middles as follows: Between the outside row next to the irrigation ditch bank and the next succeeding row, 30 inches, the next middle, 30 inches, the next middle, 30 inches, the following middle, 32 inches for accommodating the trusswork of the spray boom, the next middle, 38 inches to accommodate the tractor wheels, the next middle, 30 inches which is substantially underneath the middle portion of the tractor, the next middle, 38 inches, the next middle, 32 inches, and the next three middles, 30 inches apart, making in all, eleven middles between the twelve rows of celery which are covered by one sweep of the spraying apparatus. Therefore, in providing a celery cutter for cutting two rows of the celery at a time, it is necessary to have the width of the frame adjustable as to overall width, so as to take care of the different width of middles of celery and to properly cut the rows of celery regardless of the width therebetween.

The celery cutter hereinafter shown and described, is adapted to be drawn by attaching several of these cutters to a transversely disposed boom or draw bar mounted on a tractor so as to have alternate middles provided with a cutter so that several rows of celery can be cut at one trip across the field. In my co-pending application, Serial Number 530,106, filed April 8, 1944, now Patent No. 2,410,861, of November 12, 1946, I have shown three of these cutters disposed in side by side relation disposed in alternate middles for cutting six rows of celery at a time, and said tractor also has a draw bar disposed rearwardly of the draw bar to which the celery cutters are

2 attached onto which a pair of elongated carriages having endless belts thereon are provided so that the celery when cut can be picked up by the stripping crew and thrown onto the endless belts where it is carried towards the rear of the carriages where the tops are cut off of the bunches of celery by a revolving cutter, and field boxes are disposed on suitable shelves rearwardly of the point where the tops are cut off the celery so that the celery can be packed into the field boxes as the entire mechanism slowly traverses the field, so that the cutting and stripping and packing operations into the field boxes are continuously performed.

It is therefore an object of this invention to provide a celery cutter having a pair of wheeled frames which are movable vertically with relation to each other to suit ground contour and which are laterally adjustable relative to each other to accommodate different widths of middles between rows of celery, and having a laterally and rearwardly projecting blade on each side of the wheel frame which merges into a vertically disposed shank which is vertically adjustable and which blade is adapted to project across a row of celery and to cut the celery stalks just below the top of the ground, so that they are in position to be stripped and thrown onto the travelling carriages also attached to the tractor, the shape of the blade and shank causing the blade to automatically shed celery leaves and other undesirable matter.

It is another object of this invention to provide a celery cutter adapted to traverse the middle between two rows of celery, and having laterally and rearwardly projecting blades on each side thereof adapted to cut a row of celery on each side of the cutter as the cutter is drawn along the ground between the two rows of celery.

It is another object of this invention to provide a celery cutter comprising a wheeled frame and having a blade on each side of the frame projecting laterally and rearwardly across a row of celery and adapted to cut a row of celery on each side of the frame as the wheeled frame is drawn along between the rows of celery.

It is another object of this invention to provide a celery cutter comprising a wheeled frame having on each side thereof a laterally and rearwardly projecting blade for cutting celery and having a revoluble colter for cutting undesirable branches from the celery stalks before they are cut by the cutters, and also for cutting the lateral roots on one side of the celery stalks, so they will be pushed away from the cutter frame and fall away from the frame.

It is another object of this invention to provide a celery cutter comprising a pair of separate frames pivotally secured to each other and held in spaced relation to each other and adapted to move between two rows of celery, each frame having an individual ground wheel and each frame having a laterally and rearwardly projecting cutter projecting across a row of celery for cutting the same, and each frame having a rotary coulter running in front of the shank of the cutter for cutting fallen celery leaves and the like and also cutting the side roots of the celery on one side of the stalks and each frame having a vertically adjustable scraper disposed in front of the ground wheel for levelling the ground over which the ground wheel travels to thereby prevent sudden up and down movement of the frame by reason of the ground wheel striking a clod or clump of earth which projects upwardly from the general ground level.

Some of the objects of the invention having been stated, other objects will appear as the description proceeds, when taken in connection with the accompanying drawings, in which—

Figure 6 is a cross-sectional view taken along the line 6—6 in Figure 3.

Figure 1:
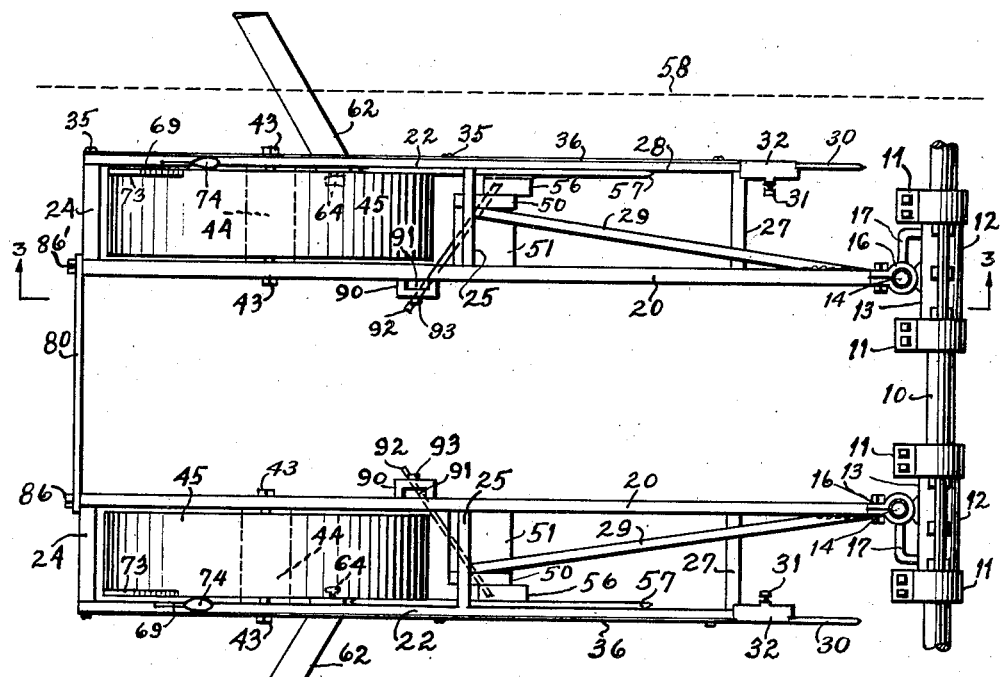
Figure 1 is a top plan view of the apparatus showing it connected to a portion of a transverse draw bar which is adapted to be secured to a tractor.
Figure 2:
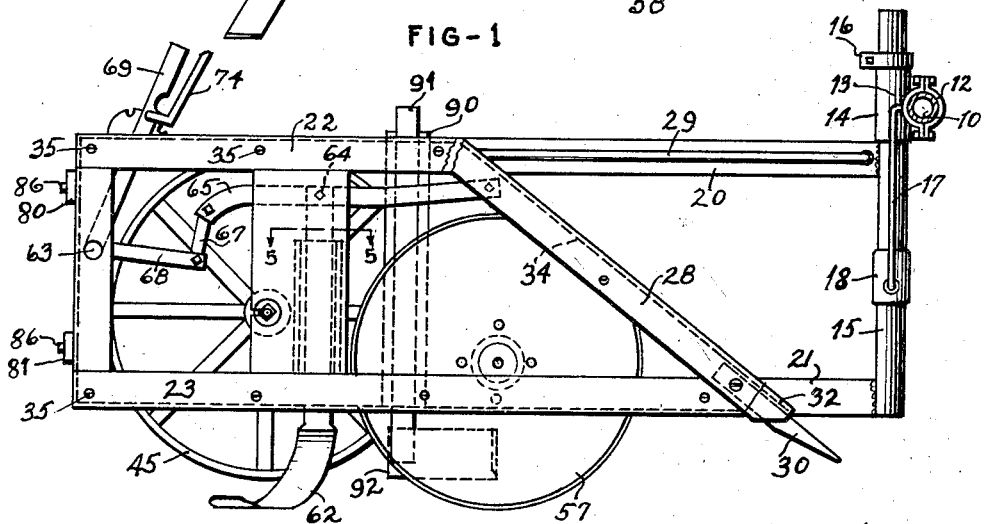
Figure 2 is a side elevation of Figure 1 looking at the lower side of Figure 1.
Figure 3:
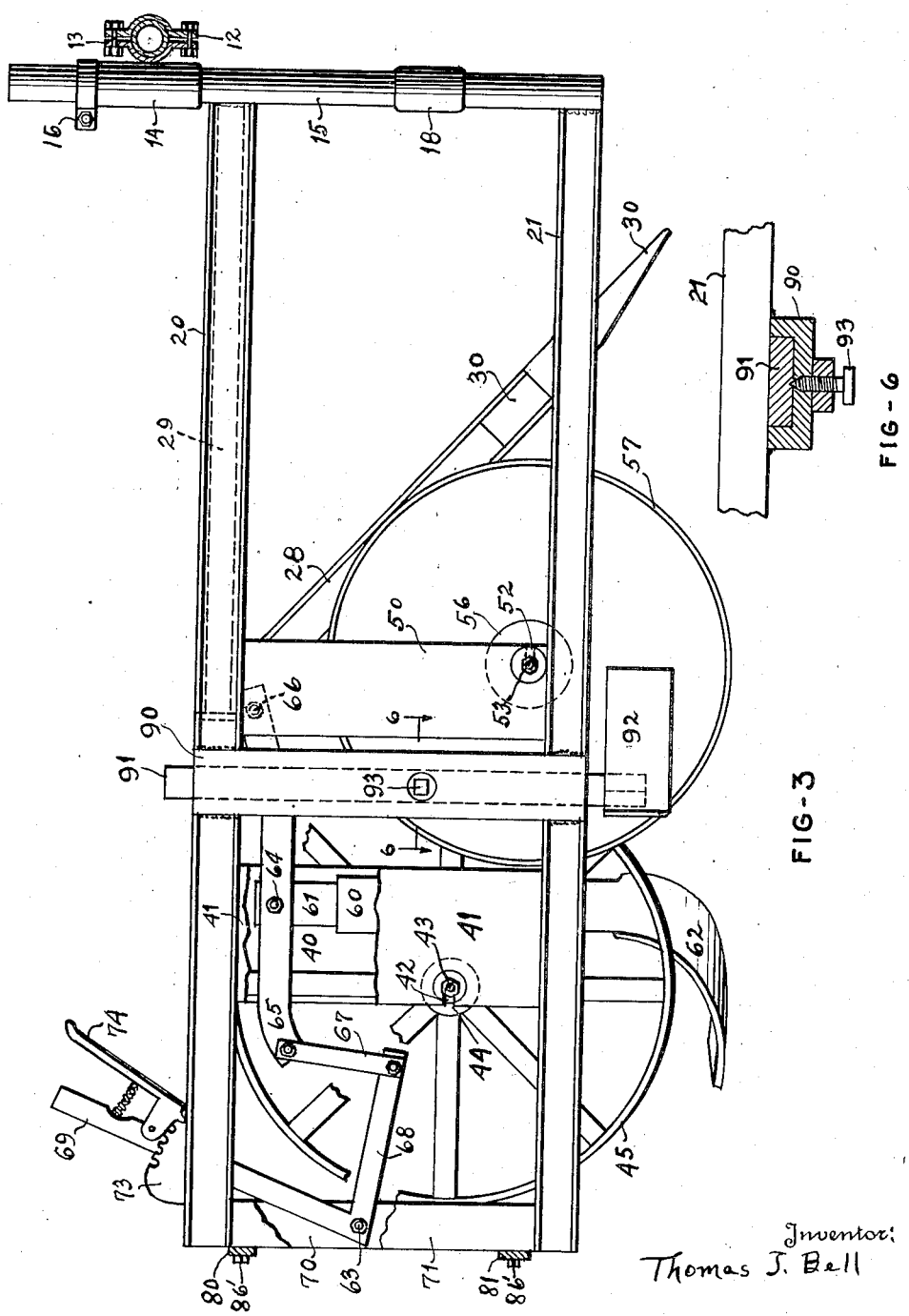
Figure 3 is an enlarged view partly in section and mostly in elevation, and taken along the line 3—3 in Figure 1.
Figures 4, 5:
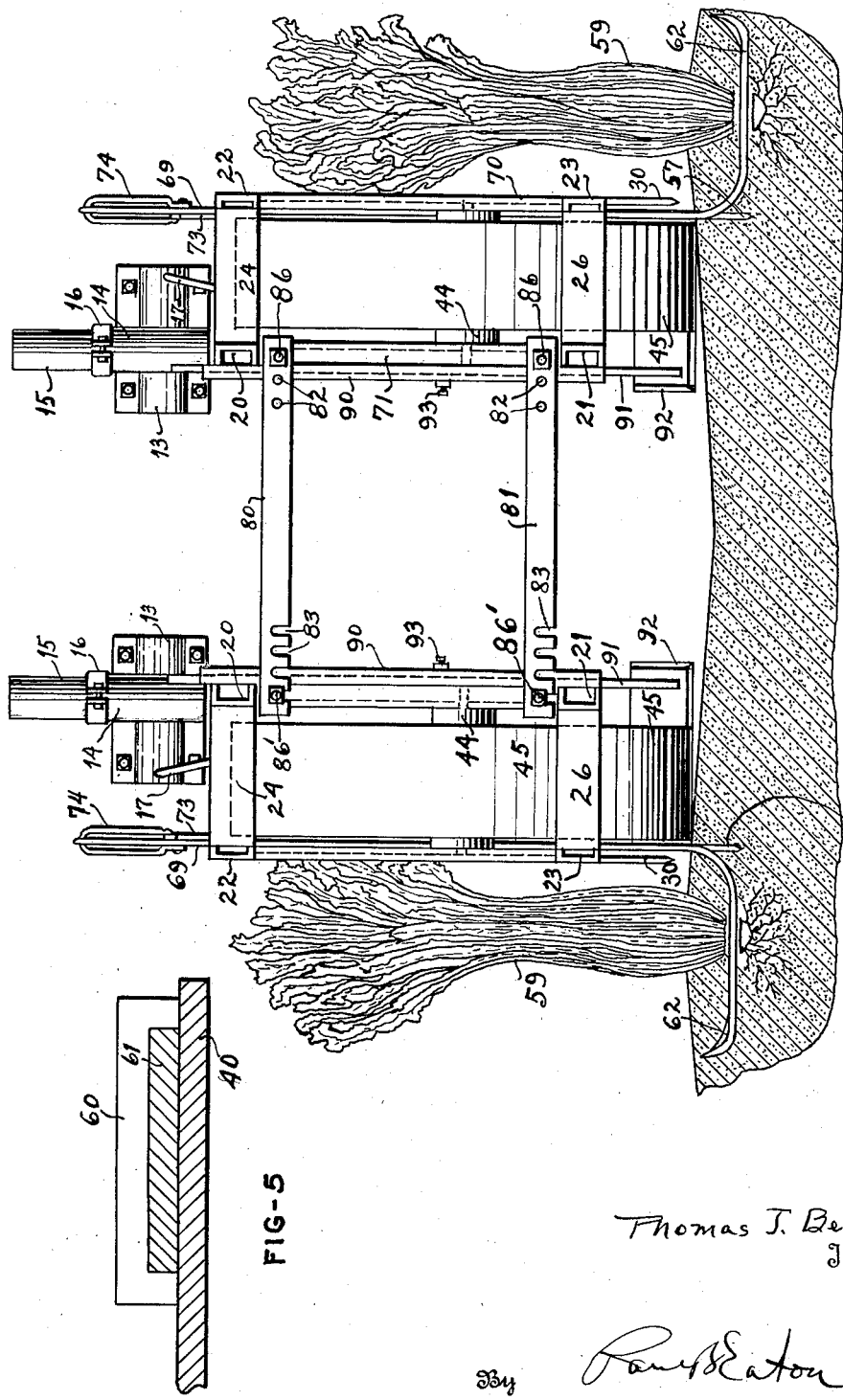
Figure 4 is a rear elevation looking at the left-hand end of Figures 1 and 2.
Figure 5 is a sectional view looking downwardly, and taken along the line 5—5 in Figure 2.

Referring more specifically to the drawings, the numeral 10 indicates a draw bar which is adapted to extend transversely of a tractor substantially midway of the tractor from front to rear and to which a plurality of the cutters herein shown and described are adapted to be secured, and which arrangement is shown in my said co-pending application, now Patent No. 2,410,861. The draw bar has a plurality of cuffs 11 adjustably mounted thereon for confining the cutter frames in proper position. Loosely secured around the draw bar is a pair of semi-circular cuff members 12 and 13 and to each cuff member 13 is welded a short pipe member 14, in which is mounted a vertically disposed pipe 15 in a loose manner so as to permit oscillation of the pipe 15 within the pipe 14, and a cuff 16 surrounds the upper end of the pipe 15 and is clamped therearound to limit downward movement of the front end of the frame.

Also secured to the cuff member 13 is a brace pipe 17 which is welded to cuff members 13 and extends downwardly and is secured by welding or otherwise to a short pipe member 18 which likewise is loosely mounted on the pipe 15.

The above arrangement allows movement of the cutter frames on both vertical and horizontal pivots. Each of the two frames are identical except they are opposite hand, and therefore, a description of one of the frames will equally apply to the other frame.

Each frame comprises an upper bar 20 and a lower bar 21 both welded to the pipe 15. These are called the inner bars of the frame. The frame also has bars 22 and 23, the upper outer bar 22 being secured as by welding to upper cross bars 24 and 25. The lower bars 23 and 21 are connected together by cross bars 26 and 27. Secured between cross bar 25, and the forward portion of top bar 20 is a brace bar 29. Between the forward ends of the outer bars 22 and 23, there is disposed, as by welding, a sloping bar 28 which has a cuff 32 on its lower end in which is adjustably mounted a finger 30 by means of a set screw 31. A sheet metal cowling member has the exterior edges thereof indicated by dotted lines 34 and is adapted to be secured in position by means of a plurality of screws 35. This cowling is omitted in all of the drawings except in Figure 1 where the top edge of the same is shown and is indicated by reference character 36.

Disposed between the upper bars 22 and the lower bars 23 is a plate member 40 and also disposed between the upper bar 20 and the lower bar 21 is a plate member 41. These plate members each have suitable notches 42 therein in which a bolt 43 is mounted which penetrates a hub 44 of a ground wheel 45.

Welded to the cross bar 25 and extending downwardly is a bar 50 whose lower end is welded to a cross bar 51, and in this bar 50 is a notch 52 in which a bolt 53 is confined, this bolt being the bearing spindle of a suitable bearing 56 which has fixedly secured thereto a disk colter 57, which penetrates the ground and severs the celery roots on one side of the stalks, and it also severs fallen leaves of celery.

Vertically disposed and secured to plate 40 by any suitable means such as by welding is a guide member 60 having slidably mounted therein a shank 61 of a cutting blade 62. This shank 61 has integral therewith a cutting blade 62 which projects outwardly and rearwardly from the side of the frame for cutting celery stalks 59 immediately below the junction point of the leaves thereon and sufficiently high as to cut a minimum of the ground roots of the celery so as to minimize the stripping operation. The rows of celery 58 are indicated by dotted lines in Figure 1. The celery stalks must be cut low enough to prevent the leaves falling apart, and yet high enough as to prevent any undue amount of roots being left on the celery stalks.

The upper end of the shank 61 has pivotally secured thereto as at 64 a link 65 which is pivoted at its forward end as at 66 to the inner surface of the sloping bar 28. To the rear end of the bar 65, there is pivotally mounted one end of a link 67, the lower end of link 67 being pivotally connected to a leg 68 which is rigidly connected to and forms a part of a lever 69 pivotally mounted as at 63 to the inner surface of a vertically disposed post 70 secured between the upper bar 22 and the lower bar 23. A similar post 71 is disposed between and secured to the upper and lower bars 20 and 21.

To the inner surface of the transverse bar 24, there is secured a quadrant 73 which projects forwardly in spaced relation to the top bar 22, and at its front end is bent inwardly and connected to the bar 22, thus providing a slot in which the lever 69 is adapted to have movement. This lever has pivoted on the upper end thereof a suitable pawl 74 for holding the lever is adjusted position.

It is thus seen that by adjusting the lever 69 along the quadrant 73, the vertical position of the cutter 62 can be easily adjusted while the machine is in operation.

Pivotally secured on bolts 86 disposed in one of the upright bars 71 are links 80 and 81. These links 80 and 81 each have a plurality of holes 82 adapted to be penetrated by the bolts 86. The other ends of the bars 80 and 81 have notches the celery plant and allowing vertical movement of one cutting knife independently of the other knife to cause the cutting depth of the knife to conform to the contour of the ground adjacent each row of celery, and a vertically adjustable scraper mounted in front of the wheels of the frame for leveling the ground in front of the wheels of the frame.

4. In celery cutter, a pair of individual frames, a wheel for each frame, means for connecting the frames to a prime mover on vertical and horizontal pivots to permit vertical and lateral swinging of the frame relative to the celery row, a cutter extending laterally from each frame, each frame having a ground wheel permitting individual movement of each frame independently of the other frame, means pivotally connecting the rear ends of each frame to each other to hold them a definite distance apart from each other, and a vertically adjustable scraper mounted in front of the wheel of each frame for leveling the ground over which the wheel travels.

5. In a celery cutter, a pair of individual frames, a wheel for each frame, means for pivotally connecting the frames to a prime mover on vertical and horizontal pivots to permit vertical and lateral swinging of the frames relative to the celery row, a cutter extending laterally from each frame, each frame having a ground wheel permitting individual movement of each frame independently of the other frame, means pivotally connecting the frames to each other to hold them a definite distance apart from each other, and a vertically adjustable scraper mounted in front of the wheel of each frame for leveling the ground over which the wheel travels.

6. In a celery cutter, a pair of wheeled frames adapted to be pulled between two rows of celery for cutting the same, means on the front end of the frames for pivotally securing the frames to a prime mover and permitting both lateral and vertical pivoting of the frames, each of the frames having a wheel contacting the ground at a point adjacent one side of the row of celery, each frame having a blade provided with a vertically disposed shank merging into a horizontally, laterally, and rearwardly extending cutting portion, means for vertically adjusting the blade relative to the frame in which it is mounted, the cutting portion of the blade being adapted to engage the celery roots at a point disposed at a right angle to the line of travel of the frame from where the wheel contacts the ground, and a vertically adjustable scraper mounted in front of the wheel of each frame for leveling the ground over which the wheel is to travel.

7. In a celery cutter comprising a pair of wheeled frames flexibly connected together to permit vertical movement of one frame relative to the other frame, the said frames being adapted to pass between two rows of celery, means for pivotally connecting the front end of the frames to a prime mover for both lateral and vertical pivotal movement of the front end of the frames relative to the prime mover, the frames being spaced apart from each other and held in spaced relation to cause the outer sides of the frames to rub against the rows of celery, each of said frames having a revolving disk coulter disposed in front of the wheel of the frames for penetrating the ground and severing the side roots of the celery, each of the frames having a cutting blade mounted thereon for vertical adjustment relative to the frame, each cutting blade comprising a vertically disposed shank slidably mounted in the frame and being bent into a horizontal plane and the portion of the blade which occupies a horizontal plane projecting rearwardly and outwardly from the side of the frame, the lower end of the shank and the bent portion of the cutting blade merging into the horizontal portion as well as the horizontal portion having the front edges thereof sharpened and serving to shed undesirable matter from the shank and the blade as the celery cutter progresses between two rows of celery, the point of contact of the wheel of each frame with the root being substantially equidistant from the front end of the frame, and a vertically adjustable scraper mounted in front of the wheel of each frame for leveling the ground over which the wheel is to travel.

8. In a celery cutter comprising a pair of frames pivotally connected together, each frame having a ground wheel adjacent its rear end, the front end of each frame being pivotally connected to a prime mover for both vertical and lateral pivotal movement, each frame having a coulter adapted to penetrate the ground in front of the wheel and adjacent the row of celery for cutting the side roots of the celery on that side adjacent the frame, each frame having a cutting blade comprising a vertically disposed shank mounted for vertical adjustment relative to the frame, each shank having integral therewith a horizontal cutting portion which is bent into a curve between the shank portion of the blade and the horizontal cutting portion, the horizontal cutting portion extending outwardly and rearwardly relative to the frame for engaging the roots of the celery and cutting the same, the point where the cutting portion of the blade engages the root of a celery plant being substantially at the same point along the row of celery as the point where the ground wheel contacts the ground, and a vertically adjustable scraper mounted in front of the wheel of each frame for leveling the ground over which the wheel is to travel.

9. In a celery cutter, a pair of wheeled frames adapted to be pulled between two rows of celery for cutting the same, means on the front ends of the frames for pivotally securing the frames to a prime mover and permitting both lateral and vertical pivoting of the frames, each frame having a cutting blade extending laterally and rearwardly of the frame, each cutting blade being bent upwardly to form a vertically disposed shank portion, means for securing the shank portion in the frame for vertical adjustment, a coulter disposed in front of and in alinement with the shank portion to sever the side roots of celery plants before the main root portion is severed by the cutting blade, and a vertically adjustable scraper mounted in front of the wheel of each frame for leveling the ground over which the wheel is to travel.

10. A celery cutter comprising a frame, a cutting blade comprising a vertically disposed shank portion secured in the frame and a laterally and rearwardly extending cutting portion integral with the lower end of the vertically disposed shank, the front edge of the cutting portion and the lower portion of the shank having their front edges sharpened, a ground wheel secured to the frame for supporting the frame and a scraper disposed in front of the ground wheel for leveling the ground over which the ground wheel is to travel.

11. A cutting implement for a celery cutter frame comprising a vertically disposed shank por- 83 therein which fit over bolts 86' in the inner upright bar 71 of the other cutter frame.

In order to provide a level surface over which the ground wheels 45 travel, I provide a suitable scraper which in the present form comprises a vertical guide member 90 secured on the inside top and bottom bars 20 and 21 of the frame, this member 90 being a channel bar which is welded or otherwise secured to the bars 20 and 21 and it has a channel extending vertically from top to bottom in which a shank 91 is mounted and on the lower end of this shank is welded a scraper blade 92 which projects forwardly into close proximity to one side of the rotary or revolving coulter disk 57. This scraper may be adjusted vertically with relation to the frame by means of a set screw 93 threadably mounted in the member 90 and being adapted to engage the shank 91 and hold the same in vertically adjusted position. The scraper 92, it will be noted does not engage fallen celery leaves until after they have been severed by the coulter and pushes these celery leaves out of the path of the ground wheel 45. The scraper also knocks down and levels any upwardly projecting lumps of earth or any other matter which might cause the ground wheel to rise and fall relative to the general contour of the land. This prevents the knife 62 from being raised upwardly to a point where it might sever some of the celery stalks too high and thus ruin the same. This scraper also has a tendency to fill in low places in the surface of the soil in front of the ground wheel and thus prevents the ground wheel from dropping into a pocket and thus causing the blade 62 to cut the celery roots too far down in the ground.

In operation, a plurality of these cutters are secured to an elongated transversely disposed draw bar 10 secured to a tractor and the frames are adjusted relative to each other as to suit the width of the middle being traversed by the frames. The finger 30 is adjusted relative to the ground to cause it to pick up the green leaves of celery which might be fallen partially toward the ground and raise them upwardly, and direct them over the front edge of the sloping bar 28 and to the exterior of the cowling 36 disposed on the exterior of the frame. However, the finger 30 is not adjusted close enough to the ground to pick up the dead leaves which have fallen downwardly onto the ground, and these are allowed to pass rearwardly and to be severed by the colter disk 57 along with the laterally projecting roots of the celery stalks before the celery stalks are cut by the blades 62.

By means of the individual ground wheel for each frame and the pivotal connection between the frames, it is seen that due to the fact that the cuff members 12 and 13 are loosely mounted on the pipe 11, that each frame can have individual vertical movement relative to the other frame without affecting in any manner the other frame except that it might draw it a fraction of an inch away from the row which it is cutting. This allows each ground wheel which is running close by the row of celery to regulate the depth of cut of the celery stalks by its associated blade. Furthermore, it is to be noted that the point of cutting is at right angles to the lowermost portion of the wheel, so that as the contour of ground changes, the depth of the cutter blades will also change, so as to cut the celery at a predetermined depth below the top of the ground at all times and regardless of the contour of the land.

It is also to be noted that the front cutting edge of each cutter extends upwardly along its shank, so as to cut undesirable leaves and other debris that may lodge against it, and also that this front vertical portion of the shank which is sharpened and merges into the horizontally disposed cutting edge of the blade is sloped in the same manner as the blade, so as to cause the shank and blade to shed any debris which might collect thereon if it should not be cut by the blade, as it will slide on off the end of the blades due to their slope rearwardly as they progress outwardly.

The coulter 57 penetrates the soil and cuts the lateral roots of the celery stalks. The blade 62 cuts the celery stalks, and as the sides or cowling sheets 36 are pressing against the celery stalks, the stalks whose roots are severed on one side by the coulter and at the bottom by the cutting blade are pushed over onto the ground, all stalks in one row falling in the same direction.

In the drawings and specification, there has been set forth a preferred embodiment of the invention, and although specific terms are employed, they are used in a generic and descriptive sense only, and not for purposes of limitation, the scope of the invention being defined in the claims.

I claim:

1. In a celery cutter, comprising a wheeled frame adapted to be drawn between two rows of celery and having a laterally and rearwardly extending blade projecting from each side thereof for cutting the celery, each blade being individually adjustable as to height relative to the wheeled frame, the wheels of the frame contacting the ground in a line intersecting the rows of celery at right angles. At the point where the blade contacts a stalk of celery, a coulter on each side of the frame for penetrating the ground in front of the cutters and wheels for severing the fallen celery leaves and for also severing the celery roots on one side of the stalks of celery, and a vertically adjustable scraper mounted in front of the wheels of the frame for leveling the ground in front of the wheels.

2. In a celery cutter comprising a wheeled frame adapted to be drawn between two rows of celery, a blade projecting from each side of the frame to extend across an adjacent row of celery for cutting the celery as the frame is passed between the rows of celery, each blade being individually adjustable vertically of the frame for regulating the depth of cut, the two sides of the frame being vertically movable relative to each other to permit one side of the frame to raise vertically without affecting the other side of the frame, a revoluble disk colter disposed in front of the blades for cutting the roots of the celery stalk on that side of the stalk and also cutting leaves of celery from the stalk which may be deposited on or near the ground and a vertically adjustable finger mounted on each side of the frame for raising other celery leaves upwardly and directing them to the exterior of the frame so that they will not be cut by the revolving colter blade, and a vertically adjustable scraper mounted in front of each of the wheels of the frame for leveling the ground in front of the wheels of the frame.

3. A celery cutter comprising a wheeled frame adapted to be drawn between two rows of celery, a cutting knife extending laterally from each side of the frame for extending across a row of celery and cutting the same, the wheel contacting the ground being disposed at a point laterally of the point where the cutting knife engages tion, the lower end of the shank portion extending downwardly and outwardly and rearwardly and merging with a horizontally disposed and rearwardly and laterally projecting portion, all portions of the cutting implement except the vertically disposed shank portion having a cutting edge on the front edge thereof, a ground wheel secured to the frame for supporting the frame and a scraper disposed in front of the ground wheel for leveling the ground over which the ground wheel is to travel.

12. A celery cutter comprising a wheeled frame, a vertically adjustable cutter having a shank and mounted on each side of the frame and extending laterally and rearwardly from each side of the frame for cutting two rows of celery at a time as the frame is pulled along between two rows of celery, a rotary cutting disk disposed in front of the shank portion of each cutter for cutting leaves of celery stalks which may have fallen onto the ground prior to the celery stalks being cut by the laterally and rearwardly projecting cutters, and a scraper mounted on the frame and disposed in front of ground wheel of the frame for leveling the ground over which the wheel is to travel.

13. In a celery cutter, a frame having ground wheels and a pair of cutters projecting lateraly and rearwardly from each side thereof for simultaneously cutting rows of celery disposed on each side of the frame, each cutter having a vertically disposed shank slidably mounted in the frame, means for adjusting the position of the shank vertically relative to the frame to thereby regulate the depth of cut of the cutter, a revoluble cutting disk disposed in front of the shank of each cutter for cutting fallen leaves of celery and the like before the laterally and rearwardly extending cutters cut the stalks of celery, the frame having means for adjusting the overall width thereof to suit various widths of rows of celery between which the cutter may be drawn, and a scraper mounted on the frame and disposed in front of ground wheel of the frame for leveling the ground over which the wheels are to travel.

14. A celery cutter comprising a wheeled frame having a blade projecting laterally from each side thereof and adapted to be drawn between two rows of celery for simultaneously cutting both rows of celery, the wheels of the frame contacting the ground in a line intersecting the rows of celery at right angles at the point where the blade contacts a stalk of celery, a revolving disk or coulter mounted on each side of the frame for penetrating the ground in front of the cutter on that side of the frame for severing the fallen celery leaves and also severing the celery roots on one side of the stalks of celery.

15. In a celery cutter, a pair of wheeled frames pivotally connected together to hold them a definite distance apart from each other and permitting vertical movement relative to each other, each of the frames having a cutting blade extending laterally from the lower portion thereof across an adjacent row of celery to cut the celery as the frames are drawn along between the two rows of celery, the wheels of the frame contacting the ground in a line intersecting the rows of celery at right angles at the point where the blade contacts the stalk of celery, a revolving disk coulter mounted on the outside of each frame for penetrating the ground in front of the cutter for severing the fallen celery leaves and for also severing the celery roots on one side of the stalk of celery.

16. In a celery cutter comprising a wheeled frame adapted to be drawn between two rows of celery and having a laterally and rearwardly extending blade projecting from each side thereof for cutting the celery, each blade being individually adjustable as to height relative to the wheeled frame, the wheel of the frame contacting the ground in a line intersecting the rows of celery at right angles at the point where the blade contacts a stalk of celery, a revolving disk coulter mounted on each side of the frame for penetrating the ground in front of the blade for severing the fallen celery leaves and for also severing the celery roots on one side of the stalks of celery.

17. In a celery cutter comprising two wheeled frames disposed in side by side relation and connected together for vertical movement independently of each other and adapted to be drawn between two rows of celery, a blade projecting from the outer side of each frame to extend across an adjacent row of celery for cutting the celery as the two frames are passed between the rows of celery, means for individually adjusting each blade vertically of its frame for regulating the depth of cut, a revoluble disk coulter mounted in each frame and disposed in front of its blade for cutting the roots of the celery stalk on that side of the celery stalk disposed next to the frame and also for cutting leaves of celery from the stalk which may be disposed on or near the ground, and a vertically adjustable finger mounted on each frame in front of its coulter for raising other celery leaves upwardly and directing them to the exterior of the frame so that they will not be cut by the coulter.

18. A celery cutter comprising a wheeled frame having a blade projecting laterally from each side thereof, the frame being adapted to be drawn between two rows of celery, the wheels of the frame contacting the ground in a line intersecting the rows of celery at right angles at the point where the blade contacts a stalk of celery and a vertically adjustable scraper mounted on each side of the frame and disposed in front of and in the line of travel of a wheel.

19. In a celery cutter, a pair of wheeled frames connected together to hold them a definite distance apart and permitting vertical movement relative to each other, each of the frames having a cutting blade extending laterally from the lower portion thereof across an adjacent row of celery to cut the celery as the frames are drawn along between two rows of celery, the wheels of the frames contacting the ground in a line intersecting the rows of celery at right angles at the point where the blade contacts a stalk of celery and a vertically adjustable scraper mounted in each frame and disposed in front of and in the line of travel of the wheel of each frame.

THOMAS J. BELL.

REFERENCES CITED

The following references are of record in the file of this patent:

UNITED STATES PATENTS

| Number | Name | Date |
| --- | --- | --- |
| 345,981 | Miller | July 20, 1886 |
| 452,440 | Miller | May 19, 1891 |

Certificate of Correction

Patent No. 2,438,598.  March 30, 1948.

THOMAS J. BELL

It is hereby certified that error appears in the printed specification of the above numbered patent requiring correction as follows: Column 6, line 36, claim 1, for "angles. At the" read *angles at the*; and that the said Letters Patent should be read with this correction therein that the same may conform to the record of the case in the Patent Office.

Signed and sealed this 1st day of June, A. D. 1948.

[SEAL]

THOMAS F. MURPHY,
*Assistant Commissioner of Patents.*